United States Patent [19]
Tsukui et al.

[11] Patent Number: 4,629,664
[45] Date of Patent: Dec. 16, 1986

[54] LIQUID FUEL CELL

[75] Inventors: Tsutomu Tsukui, Hitachi; Saburo Yasukawa; Toshio Shimizu, both of Katsuta; Ryota Doi, Ibaraki; Motoo Yamaguchi; Shuzou Iwaasa, both of Hitachi, all of Japan

[73] Assignee: Hitachi, Ltd., Tokyo, Japan

[21] Appl. No.: 792,888

[22] Filed: Oct. 30, 1985

[30] Foreign Application Priority Data

Oct. 31, 1984 [JP] Japan .................... 59-229277
Apr. 10, 1985 [JP] Japan .................... 60-74264

[51] Int. Cl.$^4$ ........................................... H01M 8/04
[52] U.S. Cl. .................................................. 429/23
[58] Field of Search ............................ 429/15, 22, 23

[56] References Cited

U.S. PATENT DOCUMENTS 3,425,873  2/1969  Worsham et al. ............... 429/22
3,542,597  11/1970 Smith et al. ..................... 429/23
4,195,118  3/1980  Vasseen ........................... 429/15

FOREIGN PATENT DOCUMENTS 1105138  3/1968  United Kingdom ............. 429/15

OTHER PUBLICATIONS

Cathro, Fuel Control in Methanol-Air and Formaldehyde-Air Fuel Cell Systems, J. Electrochemical Soc., vol. 118, No. 9, Sep. 1971, pp. 1523–1529.

Primary Examiner—Donald L. Walton
Attorney, Agent, or Firm—Antonelli, Terry & Wands

[57] ABSTRACT

A liquid fuel cell having a circulation system for a fuel mixture comprising fuel and water, which comprises a first tank containing water or a water-rich fuel mixture comprising water and fuel, a second tank containing fuel or a fuel-rich mixture comprising water and fuel, a first detector for detecting the liquid level of the fuel mixture in the circulation system, a second detector for detecting a fuel concentration of the fuel mixture in the circulation system, or an output from the fuel cell, or a load current of the fuel cell, a valve means for controlling flow of the water or the water-rich mixture in the first tank to the circulation system in accordance with the output from the first detector, and a valve means for controlling flow of the fuel or the fuel-rich mixture in the second tank to the circulation system in accordance with the output from the second detector, can be stably and efficiently operated for a prolonged time in spite of different consumption rates of fuel and water even if the load current or operating temperature of the fuel cell or the temperature or humidity of the atmosphere is changed.

11 Claims, 12 Drawing Figures

LIQUID FUEL CELL

BACKGROUND OF THE INVENTION

This invention relates to a liquid fuel cell, and particularly to a liquid fuel cell capable of stable operation for a prolonged time under controlled supply of fuel and water.

Figure 1:
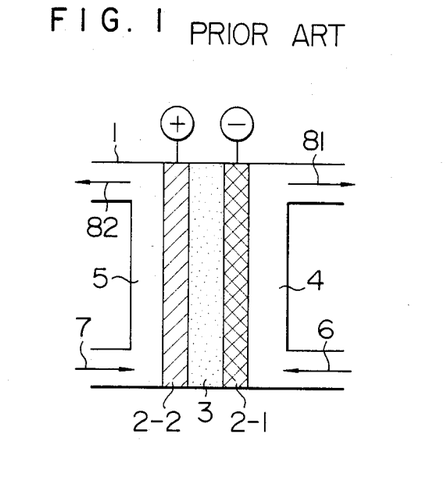
FIG. 1 is a schematic view showing the principle of a liquid fuel cell.

Generally, fuel cells using a liquid fuel are classified into an acid type and an alkali type, and methanol, formalin, hydrazine, etc. are used as fuel. The working principle of such fuel cells will be briefly described, referring to FIG. 1, where numeral 1 shows a fuel cell and symbols + and − show terminals for outputting electricity. The fuel cell 1 comprises a fuel electrode 2-1, an oxidizing agent electrode 2-2 counterposed to the fuel electrode 2-1 (the oxidizing agent electrode can be called "oxygen electrode" when oxygen is used as an oxidizing agent, or "air electrode" when air is used as an oxidizing agent), an electrolyte chamber provided between the oxidizing agent electrode 2-2 and the fuel electrode 2-1, a fuel chamber 4 provided adjacent to the fuel electrode 2-1, and an oxidizing agent chamber 5 provided adjacent to the oxidizing agent electrode 2-2. In FIG. 1, numeral 6 shows the fuel (which may contain water), or a mixture of fuel and electrolyte and also shows its flow direction, and numeral 7 likewise shows the oxidizing agent and also shows its flow direction.

The fuel cell as structured above works as follows. When the fuel 6 is supplied to the fuel chamber 4 and when the oxidizing agent 7 is supplied to the oxidizing chamber 5, the fuel 6 permeates into the fuel electrode 2-1 to generate electrons through the electrochemical reaction. When a load is given to the external circuit, a direct current can be obtained. In this case, a product 81 is formed in the fuel chamber 4. The product is a carbon dioxide gas or carbonate when the fuel is methanol, formic acid or formalin, and nitrogen when the fuel is hydrazine. When the supply of fuel 6 of a circulating type, the product contains excess fuel or electrolyte, and it is necessary to separate and vent the gaseous product from the circulation system.

On the other hand, when the oxidizing agent 7 is supplied to the oxidizing agent chamber 5, the oxidizing agent 7 permeates and diffuses into the oxidizing agent electrode 2-2 to consume electrons through the electrochemical reaction. When the electrolyte is of an acid type, a product 82 is formed. The product is mainly water and contains excess air. When the electrolyte is of a base type, water is formed at the fuel electrode 2-1.

When an aqueous solution of electrolyte such as sulfuric acid or potassium hydroxide is used in the electrolyte chamber 3 in the unit fuel cell 1 structured as in FIG. 1, the aqueous solution leaks from the electrolyte chamber 3 and thoroughly permeates also into the electrodes, and a good cell performance can be obtained. However, the aqueous solution of electrolyte also leaks into the fuel chamber 4 in this case, and thus it is necessary to supply fuel mixture containing the aqueous solution of electrolyte prepared in advance as anolyte. To this end, the fuel chamber 4 is provided with a circulation system for supplying the fuel mixture to the fuel chamber 4 by a pump 9 and a system for supplying the fuel from a fuel tank 10 through a valve 11 to the circulation system, as shown in FIG. 2.

Figure 2:
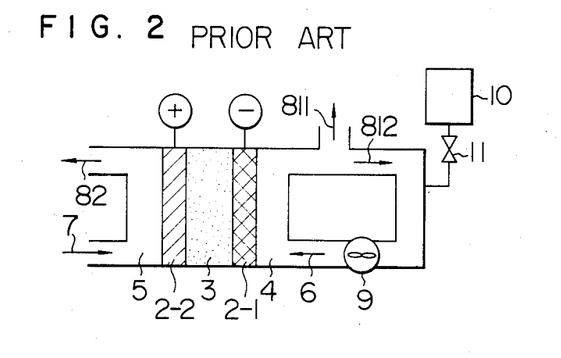
FIG. 2 is a schematic view showing the principle of a fuel cell having a fuel circulation system according to the prior art.

It has been also proposed to use an aqueous solution of polymeric electrolyte in the electrolyte chamber 3 in place of the acid electrolyte, and provide the fuel chamber with a circulation system for a fuel mixture of fuel and water adjusted to a most suitable concentration for the operation as in FIG. 2, and also with a system for supplying the fuel from the fuel tank 10 to the circulation system.

As shown in FIG. 2, the product gas 811 is vented from the circulation system after the passage through the fuel chamber 4, and the remaining mixture 812 is recycled to the fuel chamber.

According to the conventional fuel supply system as described above, a fuel mixture in a constant mixing ratio prepared in advance is supplied to the circulating system from the single fuel tank 10 shown in FIG. 2. However, it has been found that the consumption ratios of fuel and water in the circulation mixture 6 containing the fuel are not always constant, and depend on changes in load, changes in temperature of fuel cell during the operation, even though the load is constant, or changes in flow rate and temprature or humidity of the air supplied as the oxidizing agent.

In a fuel cell using a liquid fuel, the fuel supply system contains two essential components, i.e. fuel and water, and further may contain an electrolyte. In the most cases, these three components, i.e. fuel, water and electrolyte are usually contained in the fuel supply system. Among these three components, it is the fuel and water that are consumed. Usually, it is not necessary to take consumption of electrolyte into consideration. Consumption rate of fuel differs from that of water, because firstly water is always consumed at one electrode, whereas at another electrode water is always formed as a result of the electromotive reaction of a fuel cell, and formation of water at the fuel electrode or the oxidizing agent electrode, depends on the acidity or the alkalinity of electrolyte. That is, in the case of an acidic electrolyte, water is formed at the oxidizing agent electrode and consumed at the fuel electrode, whereas in the case of an alkaline electrolyte, the formation and consumption of water are reversed. In that case, one mole or two moles of water is principally formed with one mole of fuel throughout the reaction, depending on the species of fuel. Since the consumption and formation of water take place at the different electrodes, water actually tends to migrate through the electrolyte chamber to keep a water balance. Even in view of this tendency, water is short at one electrode and in excess at another electrode, owing to much dissipation of water and difficulty to keep the water balance well throughout the electrolyte chamber.

Secondly, the excess or shortage of water due to water imbalance in the water migration between the electrodes largely depends on the operating temperature and the load current.

Thirdly, the excess fuel that is not converted to the electric current at the fuel electrode migrates through the electrolyte chamber and permeates into the oxidizing agent electrode to occasion direct oxidation of the fuel, or water migrates as hydronium ions when the electrolyte ions migrate in the electrolyte chamber in the case of an acidic electrolyte. These phenomena also depend on the load current and operating temperature of a fuel cell. Furthermore, the amount of water carried by the oxidizing agent, for example, air by evaporation at the oxidizing agent electrode side depends on the feed rate, temperature and humidity of the oxidizing agent.

The consumption rate of fuel differs from that of water on the grounds as described above, and thus the supply of a mixture of fuel and water only in a constant mixing ratio from a single tank to the fuel circulation system as shown in FIG. 2 can only meet a change in the amount of only one component among the two components, i.e. fuel and water, in the fuel circulation system including the fuel chamber. That is, adequate control over the fuel and water cannot be made, and stable and prolonged operation of a fuel cell is quite impossible to conduct. That is, the fuel in the fuel circulation system may be so concentrated that the heat is much generated or the current output is lowered, or the supply of fuel fails to catch up with the consumption, so that the fuel becomes short in the fuel circulation system.

In a fuel cell using a liquid fuel, the cell voltage V shows a flat peak in a certain range of concentration $C_m$ of fuel 6 when the current is constant. At a lower fuel concentration $C_m$, the fuel becomes short and the cell voltage is lowered, whereas at a higher fuel concentration $C_m$, the excess fuel that fails to take part in the reaction at the fuel electrode 2-1 migrates through the electrolyte chamber 3 and permeates into the oxidizing agent electrode 2-2 to occasion direct combustion of fuel. As a result, the potential on the oxidizing agent electrode 2-2 is lowered with generation of heat, and consequently the cell voltage is lowered. When the fuel concentration is too high or too low (e.g. less than $C_{m1}$ or more than $C_{m2}$ in FIG. 3), the ratio of the necessary amount of electrical energy-converted fuel to the amount of consumed fuel will be lowered, and thus the fuel ultization efficiency is considerably lowered. Thus, it is very important to select an appropriate fuel concentration.

Figure 3:
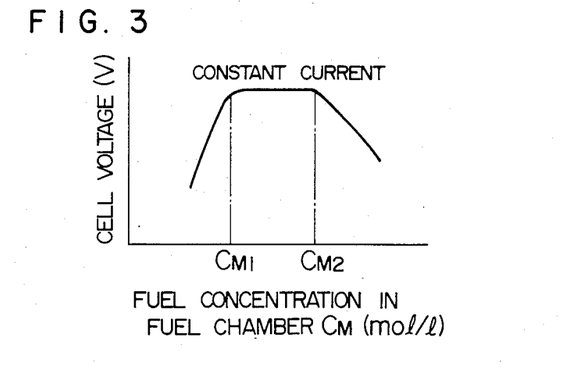
FIG. 3 is a characteristic diagram showing relationship between the fuel concentration and the cell voltage.

An appropriate range of the fuel concentration, i.e. the range of fuel concentration, $C_{m1}$ to $C_{m2}$, shown in FIG. 3, has been so far experimentally studied by many researchers. For example, in the case of an acidic electrolyte type fuel cell using methanol as fuel, it is disclosed in 24th Cell Panel Discussion Lectures No. 2B02, page 254 that the concentration $C_{m1}$ is 0.5 moles/l and the concentration $C_{m2}$ is 2 moles/l at the current density of 64 mA/cm$^2$. Japanese Patent Application Kokai (Laid-open) No. 56-118273 discloses that the concentration $C_{m2}$ is about 5% by weight (about 1.6 moles/l).

On the other hand, even in a liquid fuel cell using hydrazine as fuel, Japanese Patent Publication No. 48-31300 discloses that stable operation is possible at 1.5% by weight (0.5 moles/l), and if the concentration is less than 1.5% by weight, the voltage is lowered and the temperature is increased.

It is seen from the foregoing that the fuel concentration range for stable operation is about 0.3 moles/l as $C_{m1}$ and about 2 moles/l as $C_{m2}$.

Thus, the fuel concentration is very important in the fuel cell, and a more accurate apparatus for detecting or measuring the fuel concentration is still required.

Figure 4:
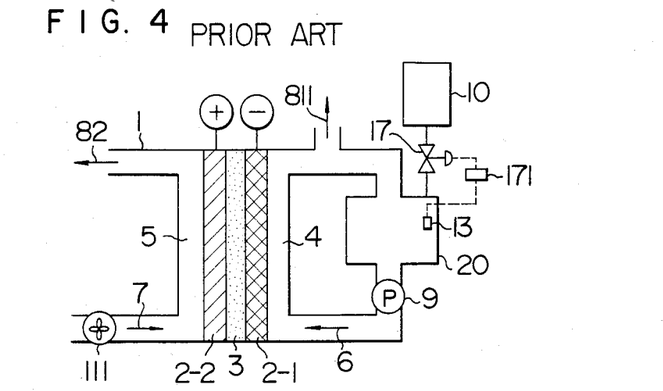
FIG. 4 is a schematic view showing a fuel cell with an apparatus for detecting a fuel concentration according to the prior art.

A liquid fuel cell provided with an apparatus for detecting a fuel concentration now in practical use is shown in FIG. 4, where the same members as in FIG. 1 and FIG. 2 are indicated with the same reference numerals.

An oxidizing agent 7 is supplied to an oxidizing agent chamber 5 by a blower 111, and discharged as a residual gas 82. On the other hand, a fuel supply system includes a system for circulating a mixture of fuel and an electrolyte solution (the mixture may be called "anolyte") by a pump 9 and a system for supplying an appropriate amount of fuel to an anolyte tank 20 provided in the circulation system from a fuel tank 10 through a valve 17. The circulation system is open to the outside at an appropriate position to discharge the product gas 811.

The fuel is supplied by opening the valve 17, and the opening or closure or control of the valve 17 is made by an apparatus 13 for detecting a fuel concentration provided in the anolyte tank 20 and a valve controller 171.

The apparatus 13 for detecting a fuel concentration comprises an anode electrode 517 (which will be hereinafter referred to merely as "anode"), a cathode electrode 518 counterposed to the anode (the cathode electrode will be hereinafter referred to merely as "cathode"), a power source 519, and a detector 520. The anode 517 comprises a platinum plate 517a and a membrane 517b tightly laid on the platinum plate 517a by pressing.

With such a structure as described above, when a DC voltage of e.g. 0.85 V is applied to between the anode 517 and the cathode 518, the quantity of electric current changes proportionally to the methanol concentration in the anolyte. Thus, it is possible to determine the concentration of methanol as fuel in a very simple structure.

However, the concentration of methanol can be indeed determined by the apparatus with such a structure as described above, but its detection sensitivity is not better, as given below.

Figure 5:
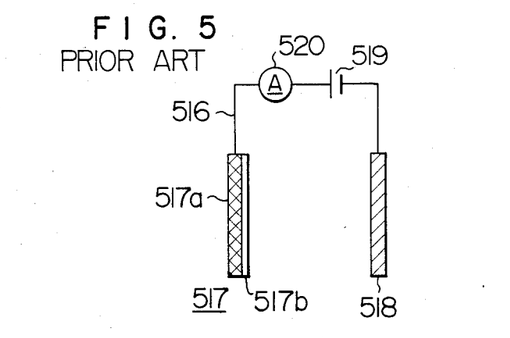
FIG. 5 is a schematic view of an apparatus for detecting a fuel concentration according to the prior art.
Figure 12:
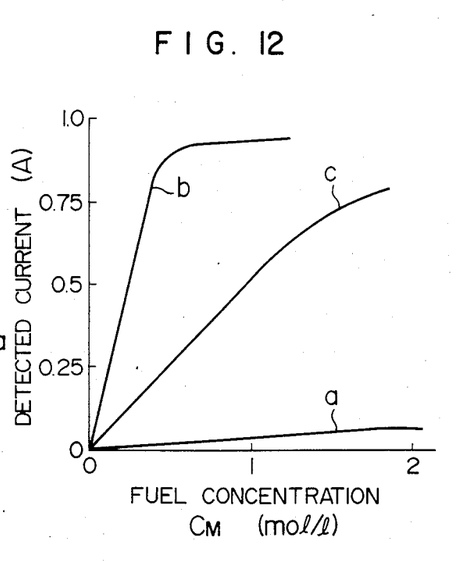
FIG. 12 is a characteristic diagram showing a relationship between the fuel concentration and the detected electric current.

Relationship between the fuel concentration and detected electric current is shown in FIG. 12, where curve a shows those determined by an apparatus for detecting a fuel concentration using an anode with the membrane as shown in FIG. 5. The electric current changes with concentration $C_m$ but the change in electric current is small. That is, the detection sensitivity is poor.

Furthermore, the adhesion between the platinum plate 517a and the membrane 517b (FIG. 5) is often inadequate, and the anolyte tends to stay therebetween, deteriorating the response to changes in the methanol concentration. When a platinum-based catalyst layer is laid on the platinum plate 517a in place of the membrane 517b, much detected current can be obtained as shown by curve b in FIG. 12, but there is no change in the detected current in the practical range (about 0.3—about 2 moles/l) and such a structure cannot be used as a sensor.

Cyclic voltammetry using a reference electrode and an apparatus for detecting a fuel concentration by means of a small fuel cell as disclosed in Japanese Patent Application Kokai (Laid-open) No. 56-118273 are also available as another apparatus for detecting a fuel concentration. In the case of the cyclic voltammetry, a reference electrode is required in addition to the detecting electrodes, and also a function generator and other devices are required, complicating the detecting system and deteriorating the reliability, the most important task of the sensor.

In the case of the apparatus using a small fuel cell, not only the apparatus is dipped in the anolyte tank, but also an additional air supply system is required, and there is a difficulty in reduction in the apparatus size as well as in the reliability.

In the case of using methanol or formalin as fuel rather than using hydrazine as fuel, the detected power output changes in a complicated manner even according to the cyclic voltammetry, and the determination is sometimes difficult to make.

There is other procedure for supplying a fuel when an integrated load current becomes constant, since the fuel concentration is proportional to the load current, but when the load is greatly changed or the operation of fuel cell is subject to repetitions of discontinuation, the fuel concentration will be greatly deviated and cannot be practically determined. A gas concentration sensor based on semi-conductors requires much time until it is settled for the measurement, and thus the response becomes poor.

Thus, a liquid fuel cell with a reliable apparatus for detecting a fuel concentration in a simple structure is in keen demand.

SUMMARY OF THE INVENTION

An object of the present invention is to provide a liquid fuel with an improved supply of fuel and water to a fuel circulation system which can operate continuously and stably for a prolonged time in spite of differences in the consumption rates of fuel and water.

Another object of the present invention is to provide a liquid fuel cell with an apparatus for detecting a fuel concentration with a high reliability and a high sensitivity in a simple structure.

The present invention provides a liquid fuel cell having a circulation system for a fuel mixture comprising fuel and water, which comprises a first tank containing water or a water-rich fuel mixture comprising water and fuel, a second tank containing fuel or a fuel-rich mixture comprising water and fuel, a first detector for detecting the liquid level of the fuel mixture in the circulation system, a second detector for detecting a fuel concentration of the fuel mixture in the circulation system, or an output from the fuel cell, or a load current of the fuel cell, a valve means for controlling flow of the water or the water-rich mixture in the first tank to the circulation system in accordance with the output from the first detector, and a valve means for controlling flow of the fuel or the fuel-rich mixture in the second tank to the circulation system in accordance with the output from the second detector.

According to the present invention, an apparatus for detecting a fuel concentration by electrochemical reaction, comprising an anode electrode provided with a fuel-controlling layer for controlling permeation of fuel through a catalyst layer, a cathode electrode, a power source and a detector, the anode electrode and the cathode electrode being dipped in the fuel mixture and a voltage being applied to the electrodes is used as a second detector in the present liquid fuel cell.

Fuel cannot be too concentrated in the fuel circulation system, because at a higher fuel concentration, excess fuel is liable to permeate into the oxidizing agent electrode from the fuel electrode through the electrolyte chamber, and undergo direct oxidation, i.e. direct consumption, considerably lowering the fuel utilization efficiency. Usually the fuel concentration in the fuel circulation system is about 0.3 to about 2 moles/l, and the absolute amount of the fuel in the fuel circulation system is small.

Thus, in the present invention a fuel concentration sensor is used to detect the fuel concentration in the fuel circulation system to supply the fuel, or an output voltage or output current of the fuel cell is detected because the output voltage or current is reduced as the fuel concentration is lowered. When the detected value becomes lower than the standard concentration, a signal to open the valve to the fuel tank is emitted to supply the fuel to the fuel circulation system.

A considerably large amount of water is present in the fuel circulation system, and thus it is preferable to supply the water to the fuel circulation system to checking whether a predetermined amount of water is retained in the fuel circulation system satisfactorily or not. To this end, a liquid level sensor is provided in the fuel circulation system of the fuel cell to detect whether the liquid level becomes lower than the standard level or not. When the liquid level is detected lower than the standard level, a signal to open the valve to the water tank is emitted to supply the water to the fuel circulation system.

In the present invention, two tanks, i.e. fuel tank and water tank, are provided, and only fuel is stored in the fuel tank and only water in the water tank. However, it is more preferable and more advantageous for the operation of the fuel cell to distribute the necessary amounts of fuel and water to the individual tanks, that is, to store mixtures of fuel and water in the individual tanks. When only fuel is supplied to the fuel circulation system from the fuel tank, higher fuel concentration is locally and transiently developed in the fuel circulation system owing to the restricted circulation rate, unpreferably lowering the fuel utilization efficiency transiently. This problem can be solved by storing a fuel-rich mixture of fuel and water in the fuel tank. Preferable molar ratio of water to fuel in the fuel-rich mixture is 5-0:1, where zero means only fuel. It is preferable to select a ratio approximating to the ratio of consumption rate of water to that of fuel on average during the operation of the fuel cell.

When only water is supplied to the fuel circulation system from the water tank, lower fuel concentration is likewise locally and transiently developed in the fuel circulation system owing to the restricted circulation rate, and the fuel decomes short locally, unpreferably lowering the performance of the fuel cell. The problem can be solved by storing a water-rich mixture of fuel and water in the water tank. Preferable molar ratio of fuel to water in the water-rich mixture is 1 to 0:1, where zero means only water. It is preferable to select a ratio approximating to the fuel concentration in the fuel circulation system in the fuel cell.

PREFERRED EMBODIMENTS OF THE INVENTION

One embodiment of the present invention will be described, referring to FIG. 6, where a liquid fuel cell using methanol as fuel and sulfuric acid as an electrolyte is illustrated. Electrodes 2 (fuel electrode 2-1 and oxidizing agent electrode 2-2) are each made from a porous carbon plate as a substrate and a catalyst of platinum-based substance supported on carbon powders, the catalyst being deposited on the substrate. Through a fuel chamber 4, a liquid mixture of methanol and dilute sulfuric acid, which, of course, contains water, is circulated as an anolyte by a pump 9. A carbon dioxide gas is generated at the fuel electrode 2-1 as a product gas 811.

Air is supplied to an oxidizing agent chamber 5 as an oxidizing agent 7, and the exhaust gas 82 contains formed water at the same time.

A liquid level sensor 12 is provided on the liquid level corresponding to the liquid level threshold value near the upper end of the electrodes 2 in the fuel circulation system. When the liquid level is lowered, the sensor 12 works to emit a signal to open the valve 111 and supply the necessary amount of water from the water tank 101 to the fuel circulation system.

A methanol concentration sensor 13 based on the electrochemical reaction is provided in the fuel circulation system and set to the methanol concentration of 1 mole/l. When the methanol concentration in the fuel circulation system becomes lower than the set value, the sensor 13 works to emit a signal to open the valve 112 and supply the necessary amount of the fuel from the fuel tank 102 to the fuel circulation system. The valves may be pumps.

Figure 6:
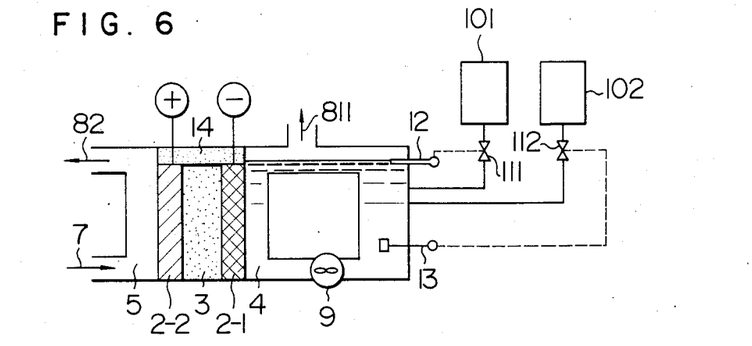
FIG. 6 is a schematic view of a liquid fuel cell according to one embodiment of the present invention.

In a liquid fuel cell with the structure of FIG. 6 and with a power output of 12 V and 100 W, the circulation rate of the anolyte in the fuel circulation system is set to 700 cc/min., and about 30 cc of water is supplied to the fuel circulation system from the water tank 101 with one opening of the valve 111 by the signal from the liquid level sensor 12 when the liquid level is lowered in the fuel circulation system. About 10 cc of fuel is supplied to the fuel circulation tank from the fuel tank 102 with one opening f the valve 112 by the signal from the methanol concentration sensor 13 when the fuel concentration becomes lower than 1 mole/l.

The fuel concentration during the operation of liquid fuel cell is not necessarily 1 mole/l, and operation at a higher fuel concentration is possible, if the load current is relatively large, whereas the operation at a lower fuel concentration is also possible, if the load current is relatively small.

To set a fuel concentration, the set electric current must be changed, because the electric current is a function of fuel concentration according to the constant voltage system when the electrochemical reaction is utilized.

As described above, a liquid fuel cell with two tanks, i.e. a fuel tank containing only fuel and a water tank containing only water can be operated stably against fluctuations in load current, operating temperature or atmosphere.

Another embodiment of the present invention will be described below, referring to FIG. 7, where, when the liquid level is detected lower by the liquid level sensor in the same liquid fuel cell as in FIG. 6, a water-rich fuel mixture is supplied from the water tank 101 in place of only water. That is, since the fuel concentration in the fuel circulation system is 1 mole/l, the water-rich fuel mixture in the water tank 101 is made to have a methanol concentration of 1 mole/l. That is, the molar ratio of methanol to water is about 0.02.

In place of measuring the fuel concentration in the fuel circulation system, such a phenomenon that the output voltage is lowered as the fuel concentration is decreased can be also utilized. To this end, a detector 15 to check an output voltage level is provided as shown in FIG. 7, and when a decrease in the output voltage level is detected, the valve 112 to the fuel tank 102 is opened with a signal from the detector 15 to supply the fuel to the fuel circulation system. In that case, a fuel-rich mixture of fuel and water is supplied from the fuel tank 102 in place of fuel only to suppress local and transient increase in the fuel concentration in the fuel circulation system. Molar ratio of water to methanol in the fuel-rich mixture in the fuel tank 102 is 2. In this case, total volume of the water and the fuel in both tanks is the same as in the embodiment of FIG. 6.

In this embodiment, both tanks 101 and 102 contain fuel mixtures, and local and transient unbalance of fuel concentration in the fuel circulation system can be largely improved, and thus the circulation rate by pump 9 through the fuel circulation system can be much reduced, and a good fuel cell performance can be obtained even at the reduced circulation rate of 200 cc/min.

Figure 7:
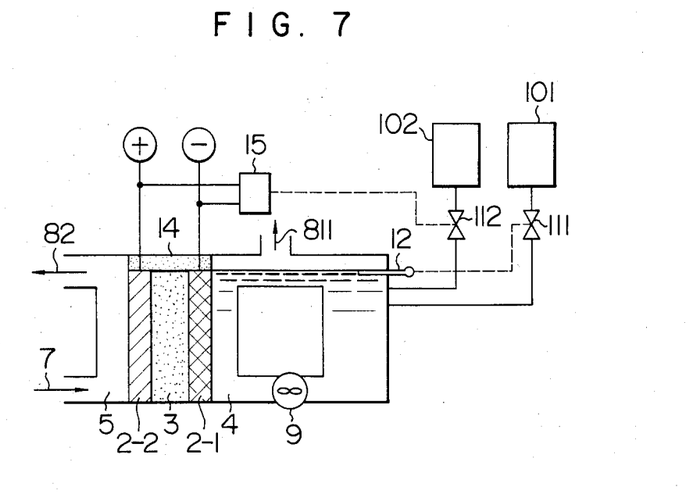
FIGS. 7 and 8 are schematic views showing liquid fuel cells according to other embodiments of the present invention.
Figure 8:
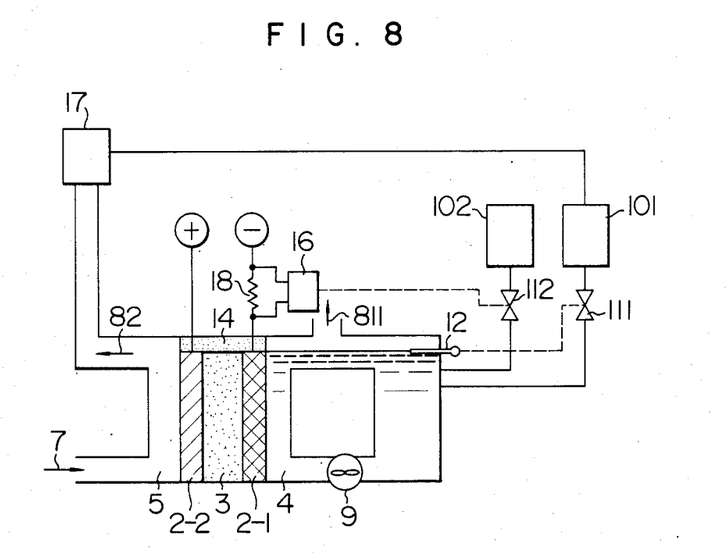

Further embodiment of the present invention will be shown in FIG. 8, where only differences from the embodiment of FIG. 7 are that a signal for supplying a fuel-rich mixture from the fuel tank 102 to the fuel circulation system is emitted in accordance with a decrease in the load current of a liquid fuel cell. A detector 16 is connected to two end points of a resistor 18 at the fuel electrode 2-1 and the valve is opened with a signal from the detector 16, and further that a portion or all of water contained in the exhaust gas 82 from the oxidizing agent chamber 5 is recovered in a trap 17 and returned to the tank 101. By the provision of the water recovery trap, the capacity of water tank 101 can be reduced.

In the foregoing embodiments, liquid fuel cells using methanol as fuel and an acidic electrolyte have been described, but the present invention is readily applicable also to an alkaline type liquid fuel cell using methanol as fuel, and other liquid fuel cells using hydrazine, formaldehyde, etc. as fuel by providing the fuel cell with two tanks and selecting fuel-water ratios of fuel mixtures in the tanks, as described above.

When a apparatus for detecting a fuel concentration according to the following embodiments is used in the present liquid fuel cell, the effects of the present liquid fuel can be further improved as described below.

Figure 9:
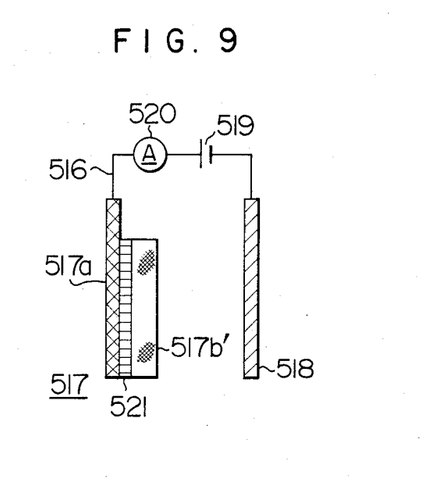
FIG. 9 is a schematic view showing an apparatus for detecting a fuel concentration according to one embodiment of the present invention.

In FIG. 9, an apparatus 516 for detecting a fuel concentration according to one embodiment of the present invention is schematically given, which comprises an anode 517, a cathode 518, a power source 519 and a detector 520, as in the prior art, but the anode 517 has a fuel-controlling layer 517b' through a catalyst layer 521 in the present invention. The fuel-controlling layer 517b' is prepared from a carbon fiber paper treated with a suspension of fine polytetrafluoroethylene particles by baking to give a controlled permeation and a strong water repellency to the paper. The fuel permeation can be adjusted to, for example, about $7 \times 10^{-6}$ moles/cm$^2$·min·mole/l by the treatment. A platinum-based catalyst layer 521 is provided on one side of the layer 517b' by kneading the catalyst with the same suspension of fine polytetrafluoroethylene particles as used above and applying the mixture to the one side of the layer 517b', followed by baking, thereby bonding the catalyst layer to the fuel-controlling layer. Then, the resulting integrated layers are tightly laid on an anode plate 517a made from, for example, tantalum to contact the catalyst layer with the anode plate 517a. It is preferable to fix the anode 517 to a frame serving also as a support for the anode so that the fuel can permeate from the fuel-controlling layer side.

That is, resin coats or pad plates of bakelite or glass are laid on all other sides than the fuel-controlling layer by an adhesive resin to form a seal layer (not shown in the drawings), thereby preventing all the other sides from direct contact with the anolyte.

In a practical test of the apparatus of FIG. 9 under such conditions that the electrode area is 4 cm$^2$, the voltage is 0.9 volts, the fuel permeation through the fuel-controlling layer 517b' is $1 \times 10^{-6}$ to $2 \times 10^{-5}$ mole/cm$^2$·min·mole/l) and a fuel concentration is 0 to 1.5 moles/l, the detected current has a good linearity and a good sensitivity, shown by curve C in FIG. 12. That is, in the apparatus of FIG. 9, the catalyst layer 521 is provided between the anode 517a and the fuel-controlling layer 517b', and no liquid stagnation occurs therebetween, improving the permeation of the liquid, detection sensitivity and detection response.

The fuel-controlling layer 517b' for use in the present invention is not only a fibrous carbon paper but can be also a porous carbon sheet, or can be an electroconductive porous material such as sintered metal. In that case, the fuel-controlling layer must have only a function to control the permeation of fuel, and thus an insulating sintered ceramics or organic porous materials can be also used. To provide the catalyst layer on the fuel-controlling layer, various other techniques such as coating, deposition, electrophoresis, CVD, etc. can be also used.

Figure 10:
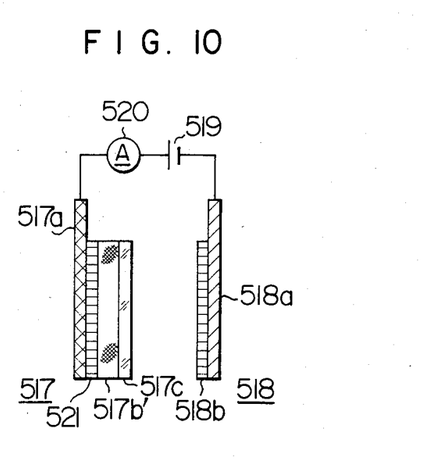
FIGS. 10 and 11 are schematic views showing apparatuses for detecting a fuel concentration according to other embodiments of the present invention.

In FIG. 10, another embodiment of the present invention is shown, where the fuel-controlling layer is used double. That is, a second fuel-controlling layer 517c is provided on the fuel-controlling layer 517b' at the cathode-facing side, where the second fuel-controlling layer 517c is prepared from a kneaded mixture of carbon powders or graphite fluoride powders with a suspension of fine polytetrafluoroethylene particles having a water repellency and an adhesiveness by applying the kneaded mixture to the surface of fuel-controlling layer 517b', followed by baking to integrate these two layers. Cathode 518 is prepared from a cathode plate 518a other than a platinum plate and a catalyst layer 518b laid on the cathode plate by deposition or by electrophoresis, and no special material is required for the cathode plate 518a. That is, a cathode with a good detection sensitivity can be obtained at a low cost.

Figure 11:
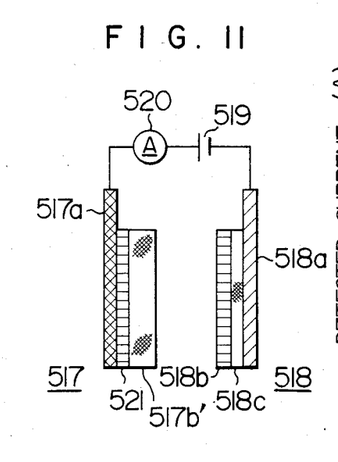

In FIG. 11, other embodiment of the present invention is shown, where the cathode is improved by preparing a cathode 518 by laying a catalyst layer 518b on an electroconductive, porous material 518c and tightly laying the integrated porous material 518c and catalyst layer 518b on a cathode plate 518a. As an electroconductive porous material, carbon fiber paper or electroconductive polymer, sintered metal, etc. can be used to ensure the tight adhesion between the cathode plate 518a and the catalyst layer 518b.

According to the present invention, a liquid fuel cell can be stably and efficiently operated for a prolonged time in spite of different consumption rates of fuel and water even if the load current or operating temperature of the fuel cell or the temperature or humidity of the atmosphere is changed.

Further, according to the present invention, an anode electrode having a fuel-controlling layer deposited thereon through a catalyst layer is used in the present apparatus for detecting a fuel concentration, and thus no liquid fuel stagnation occurs between the anode electrode and the fuel-controlling layer, improving the permeation of liquid fuel and activation of the reaction between the electrodes as well as improving the detection sensitivity and response and thus the reliability of the apparatus.

What is claimed is:

1. A liquid fuel cell having a circulation system for a fuel mixture comprising fuel and water, which comprises a first tank containing water or a water-rich fuel mixture comprising water and fuel, a second tank containing fuel or a fuel-rich mixture comprising water and fuel, a first detector for detecting the liquid level of the fuel mixture in the circulation system, a second detector for detecting a fuel concentration of the fuel mixture in the circulation system, or an output from the fuel cell, or a load current of the fuel cell, a valve means for controlling flow of the water or the water-rich mixture in the first tank to the circulation system in accordance with the output from the first detector, and a valve means for controlling flow of the fuel or the fuel-rich mixture in the second tank to the circulation system in accordance with the output from the second detector.

2. A liquid fuel cell according to claim 2 wherein the water-rich mixture in the first tank is a mixture of water and fuel having a molar ratio of fuel to water of not more than 1, and the fuel-rich mixture in the second tank is a mixture of water and fuel having a molar ratio of water to fuel of not more than 5.

3. A liquid fuel cell according to claim 1 or 2, wherein the fuel is methanol.

4. A liquid fuel cell according to claim 1, wherein a means for recovering water discharged from an oxidizing agent chamber of the fuel cell into the first tank is provided.

5. A liquid fuel cell having a circulation system for a fuel mixture comprising fuel and water, which comprises a first tank containing water or a water-rich fuel mixture comprising water and fuel, a second tank containing fuel or a fuel-rich mixture comprising water and fuel, a first detector for detecting the liquid level of the fuel mixture in the circulation system, a second detector for detecting a fuel concentration of the fuel mixture in the circulation system, a valve means for controlling flow of the water or the water-rich mixture in the first tank to the circulation system in accordance with the output from the first detector, and a valve means for controlling flow of the fuel or the fuel-rich mixture in the second tank to the circulation system in accordance with the output from the second detector, the second detector being an apparatus for detecting a fuel concentration by electrochemical reaction, comprising an anode electrode provided with a fuel-controlling layer for controlling permeation of fuel through a catalyst layer, a cathode electrode, a power source and a detector, the anode electrode and the cathode electrode being dipped in the fuel mixture and a voltage being applied to the electrodes.

6. A liquid fuel cell according to claim 5, wherein the fuel is methanol.

7. A liquid fuel cell according to claim 5, or 6, wherein the water-rich mixture in the first tank is a mixture of water and fuel having a molar ratio of fuel to water of not more than 1, and the fuel-rich mixture in the second tank is a mixture of water and fuel having a molar ratio of water to fuel of not more than 5.

8. A liquid fuel cell according to claim 5, wherein a means for recovering water discharged from an oxidizing agent chamber of the fuel cell into the first tank is provided.

9. A liquid fuel cell according to claim 5, wherein the anode electrode has a second fuel-controlling layer on the fuel-controlling layer.

10. A liquid fuel cell according to claim 5, wherein the cathode electrode comprises a cathode plate other than a platinum plate, and a catalyst layer.

11. A liquid fuel cell according to claim 5, wherein the cathode electrode comprises a cathode plate other than a platinum plate, an electroconductive porous layer and a catalyst layer.

* * * * *